United States Patent
Volkonsky et al.

(10) Patent No.: US 6,594,824 B1
(45) Date of Patent: Jul. 15, 2003

(54) PROFILE DRIVEN CODE MOTION AND SCHEDULING

(75) Inventors: Vladimir Y. Volkonsky, Moscow (RU); Alexander Y. Ostanevich, Moscow (RU); Alexander L. Sushentsov, Moscow (RU)

(73) Assignee: Elbrus International Limited, George Town (KY)

( * ) Notice: Subject to any disclaimer, the term of this patent is extended or adjusted under 35 U.S.C. 154(b) by 0 days.

(21) Appl. No.: 09/506,121

(22) Filed: Feb. 17, 2000

Related U.S. Application Data

(60) Provisional application No. 60/120,350, filed on Feb. 17, 1999.

(51) Int. Cl.$^7$ .................................. G06F 9/45

(52) U.S. Cl. ........................ 717/159; 707/5; 709/100; 709/108; 712/233; 712/240

(58) Field of Search ............... 717/151, 152, 717/154, 158, 159, 161, 146

(56) References Cited

U.S. PATENT DOCUMENTS

| | | | | |
|---|---|---|---|---|
| 4,847,755 A | * | 7/1989 | Morrison et al. | 712/203 |
| 5,202,993 A | * | 4/1993 | Tarsy et al. | 703/26 |
| 5,367,687 A | * | 11/1994 | Tarsy et al. | 717/149 |
| 5,557,761 A | * | 9/1996 | Chan et al. | 717/144 |
| 5,613,118 A | * | 3/1997 | Heisch et al. | 717/158 |
| 5,664,191 A | * | 9/1997 | Davidson et al. | 709/100 |
| 5,752,038 A | * | 5/1998 | Blake et al. | 717/158 |
| 5,794,029 A | * | 8/1998 | Babaian et al. | 712/241 |
| 5,889,985 A | * | 3/1999 | Babaian et al. | 712/225 |
| 5,923,871 A | * | 7/1999 | Gorshtein et al. | 712/221 |
| 5,958,048 A | * | 9/1999 | Babaian et al. | 712/241 |

OTHER PUBLICATIONS

Joseph A. Fisher, "Trace Scheduling, A Technique for Global Microcode Compaction," Jul. 1981, IEEE Transactions on Computer, 30:478–490.*

B. Su, S. Ding and L. Jin, "An Improvement of Trace Scheduling for Global Microcode Compaction," Dec. 1984, ACM Press, Proceedings of the 17th Annual Workshop on MIcroprogramming, pp. 78–85.*

David Bernstein and Michael Rodeh, "Global Instruction Scheduling for Superscalar Machines," Jun. 26–28, 1992, ACM Press, Proceedings of the ACM SIGPLAN '91 Conference on Programming Language Design and Implementation, pp. 241–255.*

Yaw Finn, Minjoong Rim, and Rajiv Jain, "Global Scheduling for High–level Synthesis Applications," 1994, ACM Press, Annual ACM IEEE Design Automation Conference, pp. 542–546.*

(List continued on next page.)

Primary Examiner—Gregory Morse
Assistant Examiner—David A. Snyder
(74) Attorney, Agent, or Firm—Townsend and Townsend and Crew LLP

(57) ABSTRACT

A method and apparatus for generating an optimized intermediate representation of source code for a computer program are described. An initial intermediate representation is extracted from the source code by organizing it as a plurality of basic blocks that each contain at least one program instruction ordered according to respective estimated profit values. A goal function that measures the degree of optimization of the program is calculated in accordance with its intermediate representation. The effect on the goal function of modifying the intermediate representation by moving an instruction from one of the basic blocks to each of its predecessors is tested iteratively and adopting the modified intermediate representation if it causes a reduction in the goal function.

28 Claims, 4 Drawing Sheets

OTHER PUBLICATIONS

The Russians are Coming, Keith Diefendorff, Microprocessor Report, vol. 13, No. 2, Feb. 15, 1999.

Percolation Scheduling: A Parallel Computation Technique, A. Nicolau, Cornell University, Dept. of Computer Science, Technical Report, 1984.

Trace Scheduling, A Technique for Global Microcode Compaction, Joseph A. Fisher, IEEE Transactions on Computer, 30:478–490, Jul. 1981.

An Improvement of Trace Scheduling for Global Microcode Compaction, B. Su, S. Ding and L. Jin, Proceedings of the $17^{th}$ Annual Workshop on Microprogramming, pp. 78–85, Dec. 1984.

The Multiflow Trace Scheduling Compiler, P. Lowney, et al., The Journal of Supercomputing, pp. 51–142, 1993.

Sentinel Scheduling for VLIW and Superscalar Processors, S. Mahlke et al., ASPLOS–V Conference Proceedings, Oct. 1992.

Global Instruction Scheduling for Superscalar Machines, David Bernstein, Michael Rodeh, Proceedings of the ACM SIGPLAN '91 Conference on Programming Language Design and Implementation, Toronto, Ontario, Canada, Jun. 26–28, 1991, pp. 241–255.

IA–64 Intel Application Developer's Architecture Guide, May 1999.

* cited by examiner

PROFILE DRIVEN CODE MOTION AND SCHEDULING

This application claims the priority of Provisional Application No. 60/120,350, filed Feb. 17, 1999, which is herein incorporated by reference for all purposes.

BACKGROUND OF THE INVENTION

1. Field of the Invention

The present invention relates generally to software compiler systems used by processors and computing devices. More particularly, the invention relates to a method and apparatus for optimizing object-code sequencing by such a compiler.

2. Description of the Related Art

Processors can be made faster either by using faster circuitry or by increasing the amount of simultaneous computation they perform. The degree of simultaneous computation may be increased by including instruction-level parallelism (ILP), which exploits the inherent parallelism that most programs naturally contain. The basis of ILP is that the order in which operations are performed by the processor may be rearranged so that there is overlap in the execution of operations. A simple example is where the operation of locating a memory address is performed while the value to be stored at that address is computed. Significant improvements in efficiency can be achieved by appropriate rearrangement of operations.

Some ILP processors, such as Superscalar processors, reorder operations that are known to depend on each other because of the hardware. Other processors, such as Very Long Instruction Word (VLIW) processors or Explicitly Parallel Instruction Computing (EPIC) processors, rely on the instructions themselves to express parallelism. An advantage of ILP exploitation is that individual users are not required to rewrite programs to make use of the parallelism; instead, compilation techniques are invoked automatically to map a program's ILP to the parallelism available for the target architecture.

The approaches that have traditionally been taken for reorganizing the instruction set, referred to generally as "instruction scheduling," may be categorized as either local or global scheduling, such terminology depending on the organization of the instruction sequence into "basic blocks." A basic block is a straight-line sequence of intermediate instructions having a single entry and a single exit, with no internal branches. Thus, each operation specified in a basic block will be executed once each time execution enters the block. Local scheduling refers to reorganization of instructions only within individual basic blocks while global scheduling encompasses the rearrangement of instructions between multiple basic blocks. While local scheduling may have been adequate for early processors, it is generally insufficient for modern architectures because it is inherently unable to exploit parallelism between basic blocks. This is particularly relevant for an EPIC architecture, which requires global scheduling to achieve adequate improvements.

There are several approaches to global scheduling that extract parallelism from a program by moving operations across basic block boundaries and inserting compensation copies to maintain program semantics. One is the use of a trace scheduling algorithm, which attempts to optimize the most frequently used program paths at the expense of less frequently used paths. This technique reduces the problem to a local-scheduling problem and is described, for example, in P. Geoffrey Lowney et al., "The Multiflow Trace Scheduling Compiler," *J. Supercomputing* 7, 51 (1993) and Joseph A. Fisher, "Trace Scheduling: A Technique for Global Microcode Compaction," *IEEE Trans. Comps.* C-30, 478 (1981). The technique functions by identifying a frequently executed acyclic path, i.e. a "trace," in the flow of operations and then allowing operations to move past branches or labels within that path. Corrections to the code are then inserted to compensate for such movement where basic blocks branch into the middle of traces or are branched into from traces. In particular, operations that are moved from one basic block on the trace to another basic block on the trace need to be copied to certain basic blocks that are not on the trace. While the technique reduces the overall number of instructions in the trace, this may be at the expense of increasing the number of instructions in program segments that are not part of the trace. Since those program segments that are not part of the trace are executed less frequently, the scheduling results in an overall improvement in program execution time.

Another approach to global scheduling is percolation scheduling as described, for example, in A. Nicolau, "Percolation Scheduling: A Parallel Computation Technique," Tech. Rep, Cornell Univ. (1984). This technique is based on a set of core transformations applicable to a program graph. It is a "greedy" algorithm that increases parallelism by moving operations upwards in the graph as much as possible, i.e. as close as possible to the graph node that represents the particular function being compiled. Because the technique ignores system requirements, operations that are executed with small probability nevertheless consume significant system resources. An attempt to address this deficiency is included in enhanced percolation scheduling, where operation movement is delayed until scheduling time. Enhanced percolation scheduling is described in, for example, K. Ebcioglu and A. Nicolau, "A Global Resource-Constrained Parallelization Technique," *Proc. 3d Int'l Conf. Supercomp.*, 154 (1989).

Like trace scheduling, percolation scheduling requires that compensatory code corrections be introduced. Other related techniques that also require compensatory code corrections include sentinel scheduling and region scheduling. Sentinel scheduling uses profiling information to schedule discrete multiple basic blocks ("superblocks") and is described, for example, in S. A. Mahlke et al., "Sentinel scheduling for VLIW and superscalar processors," *asplos5* 27, 238 (1992). Region scheduling, in which program transformation rules are used in an attempt to balance the program graph, is described, for example, in R. Gupta and M. Soffa, "Region scheduling: An approach for detecting and redistributing parallelism," *IEEE Trans. Software Eng.* 16, 421 (1990).

Global instruction scheduling differs from these in that it attempts to limit code duplication. While operations may be moved beyond basic block boundaries, the technique constrains the movement of operations to be within an enclosing loop. The technique is described, for example, in D. Bernstein and M. Rodeh, "Global instruction scheduling for superscalar machines," *Conf. Prog. Lang. Design and Implementation*, SIGPLAN '91, p. 241 (1991).

A further approach to global scheduling is described in U.S. Pat. No. 5,557,761, issued to Chan et al. The technique presented there operates by first selecting source and target basic blocks, which are identified according to the relationships of the instructions within them. An attempt is made to identify a maximal set of instructions contained in the source basic block that may by moved to the target basic block without violating any data dependency relationships and remaining within the confines of available resources. A model (called the "Latency Subsumption Cost of Movement Model") is used to specify the overall cost of such movement, which is then used to decide whether to move the identified maximal instruction set.

SUMMARY OF THE INVENTION

The present invention is directed to a method and apparatus for generating an optimized intermediate representation of source code for a computer program. The optimized intermediate representation is generated from an initial intermediate representation, which is extracted from the source code by organizing it as a plurality of basic blocks. Each of the basic blocks contains at least one program instruction. The basic blocks in the initial intermediate representation are ordered according to an estimated profit value that is assigned to each of the basic blocks. A goal function, which is designed as an appropriate measure of the degree of optimization of the program according to its intermediate representation, is then calculated. The effect on the goal function of modifying the intermediate representation by moving an instruction from one of the basic blocks to each of its predecessors is tested iteratively. If the modified intermediate representation causes a reduction in the goal function, it is adopted. The process iterates, progressively testing movement of instructions to predecessors, until the intermediate representation converges and the value of the goal function is minimized.

In a preferred embodiment, the iterative process proceeds by selecting a current basic block and storing the profit value of the basic block subsequent to it in the ordered representation of basic blocks. The first instruction of the current basic block is then moved to all of its predecessors to create a test intermediate representation. A new goal function is calculated based on the test intermediate representation. If the difference between the previous goal function and the new goal function exceeds the stored profit value, the test intermediate representation is adopted, but is not adopted if the difference is less than or equal to the stored profit value.

In another embodiment, the invention is directed to a computer apparatus for generating the optimized object code. The computer apparatus includes an input device capable of reading the set of source code instructions, a compiler, and an output device for outputting the optimized object code. The compiler includes a front end, an optimizer, and a code generator. The front end is programmed to generate an initial representation of the source code in terms of basic blocks, which it then orders according to an estimated profit value assigned to each basic block. The front end also calculates an initial value for the goal function. The optimizer is programmed to test iteratively the effect on the goal function of modifying the intermediate representation by moving an instruction from a basic block to each of its predecessors; if the modified intermediate representation has a lower goal function, it is adopted. The iterative procedure is carried out by the optimizer until the intermediate representation has converged. The converged intermediate representation is then converted by the code generator into the optimized object code.

BRIEF DESCRIPTION OF THE DRAWINGS

The present invention is now described in detail with reference to the accompanying drawings, wherein.

DESCRIPTION OF SPECIFIC EMBODIMENTS

Overview

Figure 1:
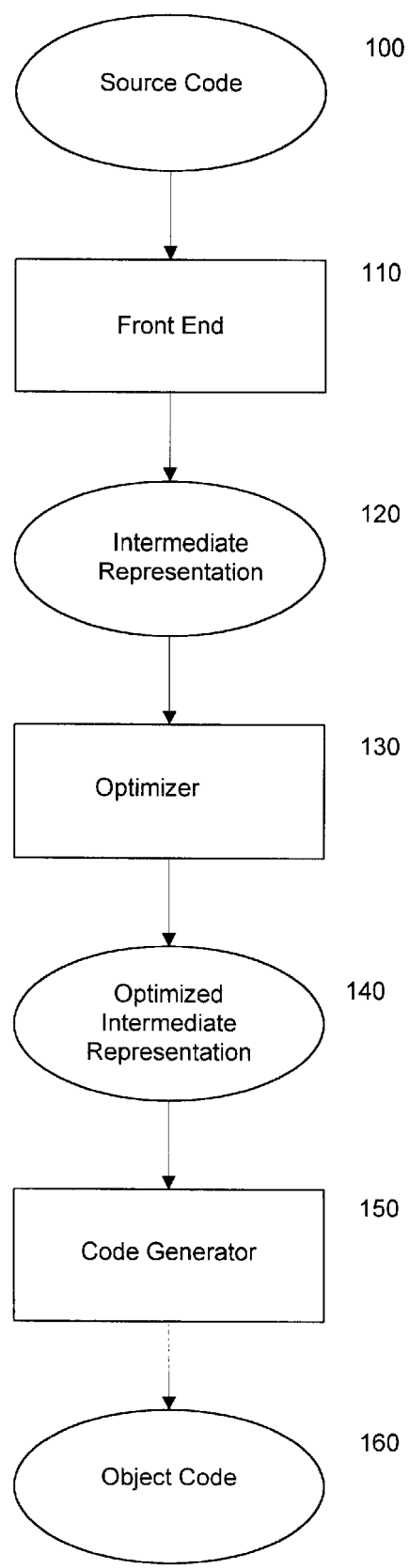
FIG. 1 presents a representation of the functioning of a compiler for taking source code and generating optimized object code.

The present invention is directed to a method and apparatus for optimizing object-code sequencing by a compiler. So that the invention is as widely applicable as possible, it is designed to be architecture independent and language independent, although in a preferred embodiment it is adapted particularly for an EPIC architecture. A schematic diagram is shown in FIG. 1 to illustrate the steps that a compiler using the invention would generally take in order to generate an optimized object code 160 from a source code program 100. In this figure, representations of the program instructions are denoted with oval boxes while the components of the compiler are represented with rectangular boxes.

It will be understood by those of skill in the art that a single "instruction" may comprise a single simple individual operation such as "ADD," "MULTIPLY," "DIVIDE," "SHIFT," LOGICAL," etc., or may comprise a plurality of such operations. In EPIC or VLIW processors, for example, instructions often consist of a plurality of such individual operations, each of which is issued at the same clock cycle in the processor hardware. In superscalar processors, specific operation grouping rules are used by the compiler to produce more efficient code, each of the resulting operation groups forming a single instruction. Thus, as used herein "instruction" refers to a group of one or more operations scheduled at the same clock cycle.

The compiler preferably comprises a front end 110, an optimizer 130, and a code generator 150. The front end 110 receives as input a set of source code instructions 100 in the form of a program or subprogram (henceforth referred to collectively as a "program") and generates an intermediate representation 120 of the source code. The intermediate representation 120 comprises a plurality of basic blocks, which are straight-line sequences of intermediate instructions having a single entry and a single exit. The intermediate representation 120 is acted on by the optimizer 130 to generate an optimized intermediate representation 140, which also comprises a plurality of basic blocks. The optimized intermediate output 140 is then acted on by a code generator 150, which generates the object code 160 to be used by a target machine. In generating the object code 160 from the optimized intermediate representation 140, the code generator 150 determines when each instruction will execute relative to each of the other instructions.

In the present invention, the optimizer 130 determines the optimized intermediate representation 140 by using an iterative algorithm, described in detail below, to minimize a goal function G. The goal function is a quantity that serves to measure the level of optimization of the intermediate representation of the instruction set, such that a lower value of G is consistent with a more highly optimized program. In one embodiment, for example, the goal function is the total execution time of the program. The iterative procedure begins with an initial value of G being calculated from the intermediate representation 120 of the source code. In each iteration, the optimizer 130 tests whether moving the first parallel instruction of a basic block to its predecessor blocks (i.e. all basic blocks that are to be executed immediately prior to the test basic block) results in a sufficient decrease in G. If so, the basic blocks are modified in accordance with the test and the value of the goal function reassigned. The procedure is carried out for all of the basic blocks until the minimum value of G is reached. The resulting basic-block ordering becomes the optimized intermediate representation 140, which is then used by the code generator 150 to produce the object code.

In a specific embodiment, the compiler is coupled to an input device and an output device. The input device reads the set of source code into a form that can be used by the compiler; examples include, without limitation, such devices as disk readers, CD ROM readers, and magnetic tape readers. The output device performs the opposite function with respect to the optimized object code so that it is output for use either by a separate computer apparatus or by a component of the computer apparatus that compiled the optimized object code. Examples of output devices include, without limitation, magnetic or optical device writers.

Iterative Algorithm

Figure 2A:
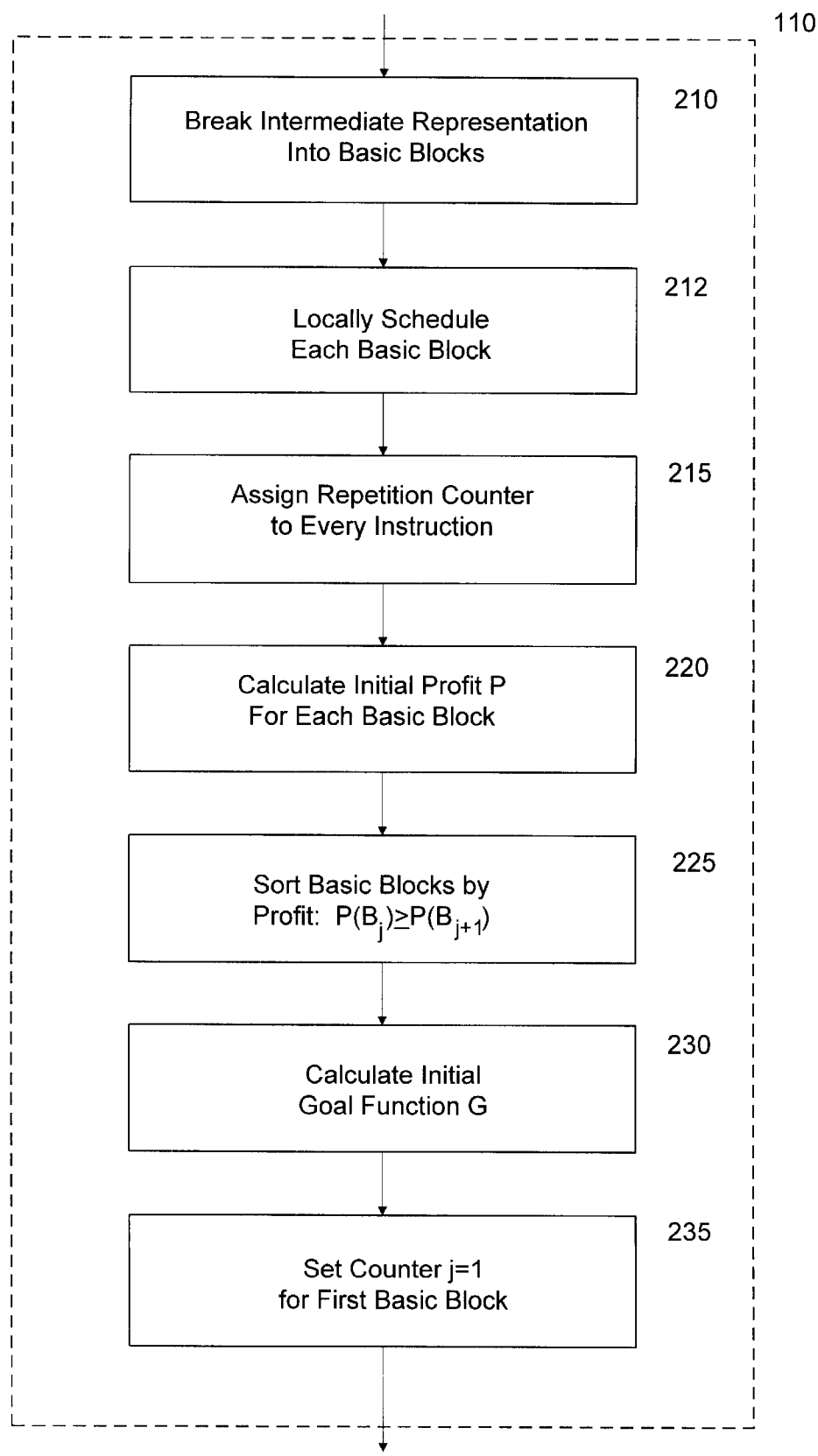
FIGS. 2a and 2b presents the detailed steps used by the iterative algorithm to construct an optimized intermediate representation of the source code.
Figure 2B:
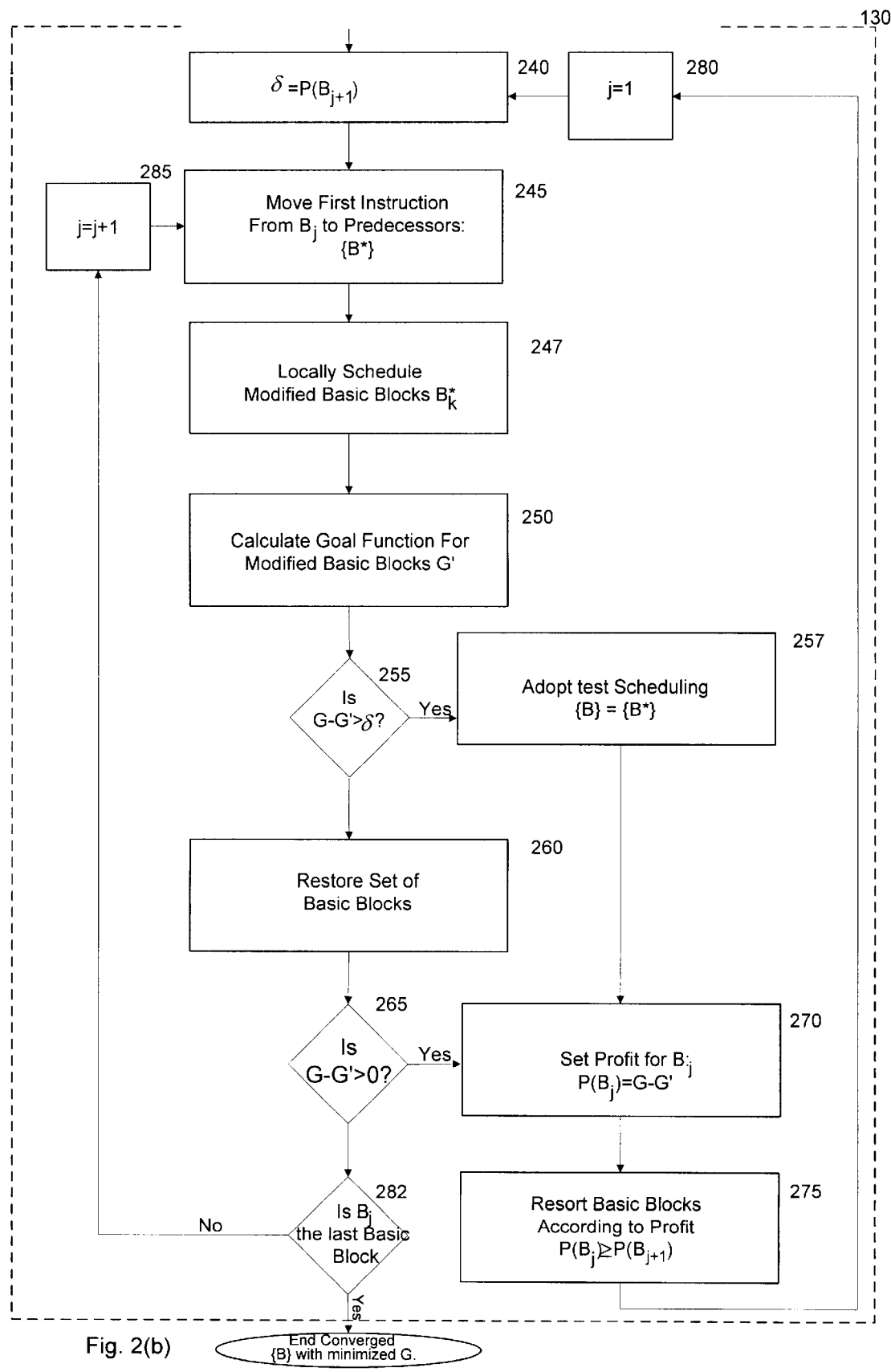

The full algorithm is shown in detail in FIG. 2. The first portion, blocks 210–235, performs the initialization of variables used in the iterative process and corresponds to the front end 110 of the compiler; the optimization is carried out by blocks 240–285, which corresponds to the optimizer 130. At step 210, the intermediate representation of the source code 110 is broken into a plurality of basic blocks, each of which is then locally scheduled at step 212. This step may be performed by any appropriate method for locally scheduling basic blocks, such techniques being known to those of skill in the art. Preferably, however, the local scheduling step 212 is performed in terms of the target architecture (such as VLIW or EPIC), thereby accounting for real operation delays and resource constraints. In the embodiment where the goal function is equivalent to the total execution time of the program, incorporating the characteristics of the target architecture into the local scheduling step 212 permits a more reliable determination of the execution time for each basic block and a more reliable grouping of individual operations into instructions for subsequent movement.

In an exemplary embodiment that makes use of graph theory, local instruction scheduling proceeds in two phases. First, a data-dependence directed acyclic graph is constructed for each basic block. As understood by those of skill in the art, a directed acyclic graph is a partially ordered representation of the basic block in which the individual operations are represented by vertices such that no path through the graph starts and ends at the same vertex. Operation pairs that have no path between them are reflected in the unordered portion of the graph, whereas the partial ordering reflects potential instruction-level parallelism that can be exploited. The structure of the graph includes all constraints inherent in the instruction set, requiring, for example, that certain vertices precede certain other vertices in accordance with the requirement that certain instructions in the basic block be performed before certain other instructions. In the second phase, the vertices are reordered into the shortest sequence subject to the built-in constraints. The reordered graph is then translated into a locally scheduled sequence of instructions.

At step 215, every instruction is assigned a repetition counter, which estimates the number of times the instruction will be performed during execution of the program. This initial assignment of the repetition counter is performed by any appropriate technique. In particular embodiments, it is assigned as a result of profiling or on the basis of a static heuristic. Profiling requires at least an additional compilation and training run of the program. It functions by having the compiler produce a simple native code of the program and insert run-time counters into it. The training run is an execution of this first compilation with some input data. The counters store relevant execution times in a file, which is then accessed by the second compilation, during which that information is used to assign the repetition counters to each of the instructions.

The use of static heuristics avoids the need for the additional compilation and training run of the program, but produces an initial assignment of the repetition counters that is less accurate. By using a set of heuristics, estimated parameters are applied to various characteristics of the program. For example, every loop may be estimated to repeat on average ten times, the probabilities of if-then branches may be assigned particular values (e.g. that the condition will be met 60% of the time and not met 40% of the time), and/or calls to subroutines with names such as "EXIT" or "ERROR" are presumed to be terminal. With such static heuristics in place, repetition counters for each instruction may be determined.

The repetition counter forms the basis in the invention for determining an initial value for the "profit" P associated with each basic block. The profit is subsequently used throughout the algorithm to evaluate to what extent it is beneficial to reschedule certain instructions. At step 220, the initial profit for each basic block is assigned to be equal to the repetition counter of the first instruction in the basic block.

After the initial profit values have been assigned, the basic blocks are sorted into an ordered list at step 225, with the first basic block in the ordered list having the greatest profit and subsequent blocks having a smaller profit, i.e. $P(B_j) > P(B_{j+1})$, where $B_j$ denotes the basic block at position j in the ordered list.

From the ordered list of basic blocks, an initial value for goal function G is calculated at step 230. While the invention includes any goal function that is an appropriate measure of the optimization of the program, it is preferably the total execution time in the embodiment where the program is to run on an EPIC architecture. In other embodiments, the goal function is a measure of the fraction of duplicated code (a measure that is dependent on the size and performance of the instruction cache) or of the fraction of speculative memory access operations (a measure that is dependent on the size and performance of the data cache) [while those of skill in the art are familiar with speculative operations, further discussion and an illustration of one are provided in the example below.] In the preferred embodiment, the initial value of the goal function is calculated as the sum of all repetition counters of all instructions in all basic blocks, a measure that is equivalent to the total execution time. The initialization phase of the algorithm is completed with step 235, in which a counter j is set equal to 1 to begin the iterative progression through the ordered list of basic blocks.

For each step of the iteration, the profit of the basic block immediately subsequent to the current basic block within the ordered list is stored as $\delta(\equiv P(B_{j+1}))$ at step 240. The value of $\delta$ is subsequently used as the parameter that defines whether a tested rescheduling has a sufficient impact on the goal function. This test rescheduling is created at step 245, where the first instruction from the current basic block is moved to all predecessor blocks to create a test set of modified basic blocks {B*}, predecessor blocks being understood by those of skill in the art to mean all basic blocks that immediately lead into the current basic block, either directly or as a result of branching. Thus, a predecessor block according to this definition is not restricted to the basic block that appears immediately before it in the ordered list. As part of creating the test rescheduling, local scheduling of the modified basic blocks is preferably performed at step 247. As for the initial local scheduling step 212, local scheduling of the modified basic blocks at step 247 is preferably performed in terms of the target architecture (e.g., VLIW or EPIC). Again, such local scheduling thereby accounts for real operation delays and resource constraints so that more reliable determinations of execution time and operation groupings are made, making the method more efficient when the goal function is the total execution time of the program.

At step 250, the goal function is calculated for the test rescheduling created in the previous step and is denoted G'. If the rescheduling produces an improvement in the goal function (called the "real profit") greater than $\delta$, as tested at step 255, then the test rescheduling is adopted at step 257. Then, at step 270, the profit for the current basic block is reassigned to be equal to the real profit resulting from the rescheduling, $P(B_j)=G-G'$, and the current basic block is subsequently reinserted into the ordered list of basic blocks according to its real profit at step 275.

If the real profit is less than or equal to $\delta$, the test rescheduling is not adopted (step 260). However, if the real profit is nonetheless positive, as tested at step 265, then the profit for the current basic block is reassigned to be equal to the real profit at step 270 and the current basic block is reinserted into the ordered list of basic blocks according to its real profit at step 275. By updating the profit associated with each basic block to be the real profit, the algorithm will converge more accurately to a rescheduling that minimizes the goal function.

The algorithm will reach step 270 whenever the real profit is positive. In this case, j is reset to 1 at step 280 and the algorithm loops back to step 240. If the real profit is not positive, no changes are made to the existing schedule nor to any parameters during the iteration through steps 240–265, so a test is performed at step 282 to see if there are any other basic blocks in the ordered list. If so, the value of j is incremented by one at step 285 and the algorithm loops back to step 240. This repeats until the iterative procedure converges by moving through the entire ordered list of basic blocks without finding a further rescheduling that improves the goal function. At this point, the iterative procedure has converged so the rescheduling is adopted as the optimized intermediate representation, which is then used by the code generator 150 to produce the object code 160.

There are several features of the algorithm worth noting. While any positive profit that results from a tested rescheduling is adopted as the real profit for the current basic block, which is resorted accordingly, movement of instructions between blocks is only achieved when the real profit exceeds a certain threshold. Because a tested rescheduling is adopted only when it generates a real profit that exceeds the profit of the next basic block, more modest real profits are sufficient for basic blocks that appear later in the ordered list and more substantial real profits are required for basic blocks that appear earlier in the ordered list. This is merely a reflection of the fact that under some conditions greater parallelism can be achieved by having a multiply-executed instruction within a single basic block rather than by including it in multiple predecessor blocks. The overall complexity of the algorithm is approximately linear and the combination of operation motion with scheduling permits direct control of the optimization being performed by means of the goal function at every iteration.

EXAMPLE

Figure 3:
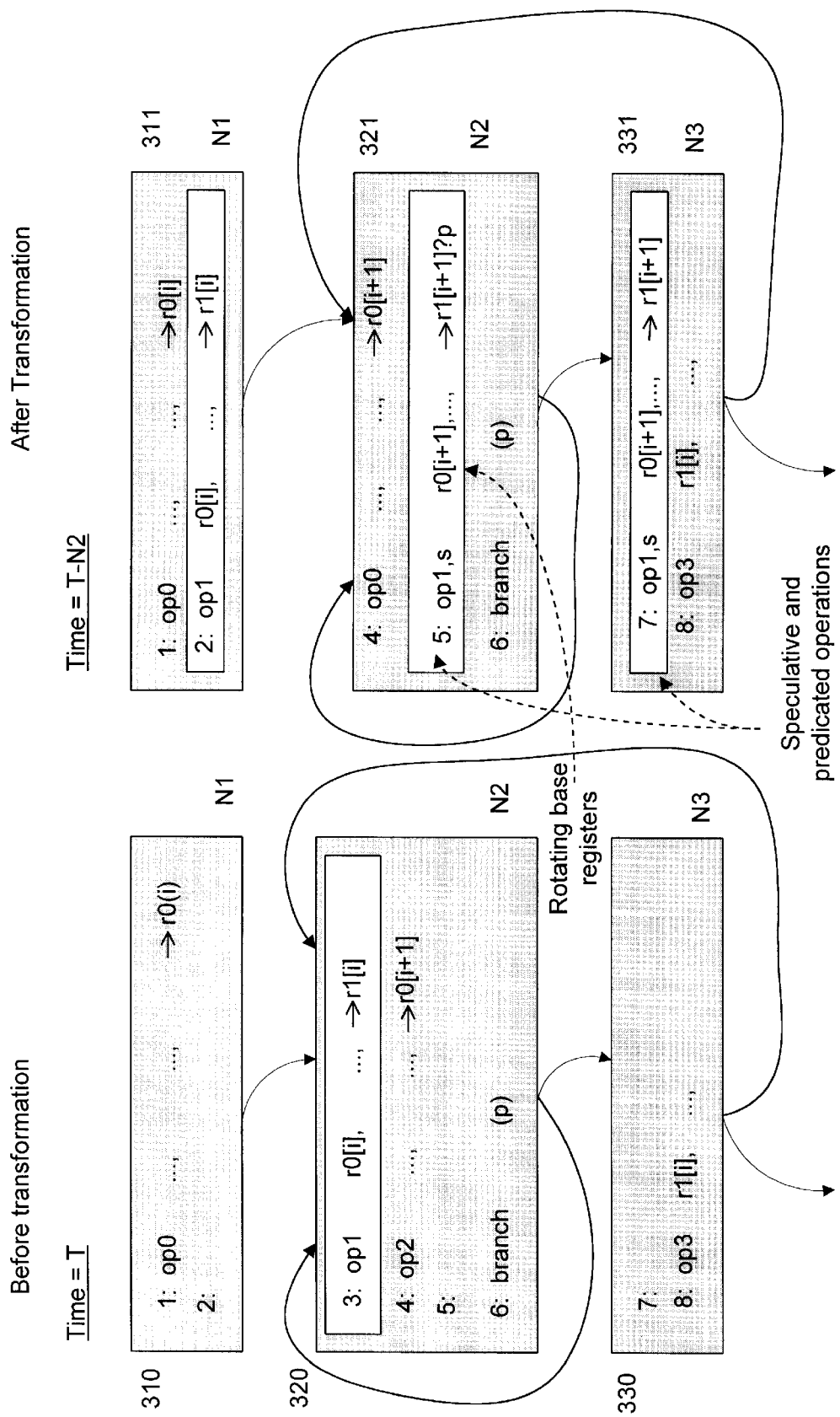
FIG. 3 illustrates the manner in which the invention functions with an illustration of how the intermediate representation of basic blocks is modified to reduce the value of the goal function.

FIG. 3 illustrates the instruction movement and scheduling, as well as some additional features, of the invention. The left column of the figure shows a fragment of source code that has been broken into an ordered list of three basic blocks 310, 320, and 330; the profit for the three basic blocks is $N_1$, $N_2$, and $N_3$ respectively such that $N_1>N_2>N_3$. As shown by the arrows, basic block 320 may receive input from any of the three basic blocks 310, 320, and 330, and basic block 330 may receive input only from basic block 320. Each line includes an arabic numeral that denotes the clock cycle. In the example, there are empty clock cycles in the left column (nos. 2, 5, and 7) that result from real operation delays.

Focusing attention on block 320 as the current basic block in the iterative portion of the algorithm, $\delta$ is set equal to $N_3$. Because basic block 320 has three predecessors, namely basic blocks 310, 320, and 330, the test rescheduling is constructed by moving the first instruction of block 320 into each of blocks 310, 320, and 330. The result of moving this parallel instruction is shown in the right column of FIG. 3; it should be noted that the instruction is not simply copied verbatim but may require some modification dictated by the structure of the program.

No variation in the form of the instruction is required in basic block 311, because the operation in basic block 310 proceeds directly from basic block 310. In blocks 321 and 331, however, the base registers in the instruction have been shifted from i to i+1 to account for the intermediate loop operations shown by the arrows. In addition, the operations in basic blocks 321 and 331 have been converted to speculative and predicated operations. This character of these operations also results from the loop characteristics of the program. In general, speculative operation results when branch instructions in the execute stage of a program affect the instruction stage, there are two possible paths of execution and the correct one is not known until the conditional branch executes. When seeking parallelism, rather than have a delay while the CPU waits until the conditional branch executes, a speculative execution path is taken. If that branch turns out to be the correct one, the branch delay has been avoided. If that branch turns out not to be the correct one, any results from its execution are discarded. Since sometimes the speculative operation will be correct, there is an overall benefit to including it as a speculative operation rather than delaying execution in every instance until the conditional branch executes. A predicated instruction is included for similar reasons. It is an operation that is executed only if some condition is true. If the predicated instruction is executed before it is known whether the condition is true, there is an execution-time savings whenever the condition turns out to be true and the results of the operation are discarded if the condition turns out to be false.

In addition to these modifications of the instructions, and most importantly, the value of the goal function G has been reduced. The goal function is calculated by summing the product of the number of clock cycles with the profit for each basic block. Thus, before the test rescheduling, $G=2N_1+4N_2+2N_3\equiv T$. After rescheduling, $G'=2N_1+3N_2+2N_3=T-N_2$. Reduction of the goal function was achieved because the instruction that was moved could profitably occupy the previously empty clock cycles. In this example, the goal function measures the execution time in terms of the number of instructions that are executed. The overall time has been reduced by $N_2$ as a result of the test rescheduling. Since $N_2>N_3$ ($=\delta$), the test rescheduling is adopted and the value of the goal function corrected from T to $T-N_2$; since the real profit was equal to $N_2$, there is no change in the basic block profit value and, hence, no reordering of the basic blocks within the ordered list.

The above description is illustrative and not restrictive. Numerous substitutions and modifications will become apparent to those of skill in the art upon review of this disclosure and can be undertaken without departing from the true spirit and scope of the invention, which is defined in the following claims.

What is claimed is:

1. A method of generating an optimized intermediate representation (IR) of source code for a computer program from an initial IR, both the initial and optimized IRs comprising a plurality of basic blocks, each of which comprises at least one instruction, the method comprising the steps of:

(a) ordering the basic blocks of the initial IR according to an estimated profit value assigned to each basic block, wherein the estimated profit value is related to a repetition counter assigned to each instruction in the initial IR, the repetition counter being an estimate of the number of times its instruction is performed during execution of the computer program according to the initial IR;

(b) calculating a goal function that measures the degree of optimization of the computer program according to its initial IR; and (c) iteratively testing the effect on the goal function of modifying the IR by moving an instruction from one of the basic blocks to each predecessor of that basic block, adopting the modified IR if the effect is a reduction of the goal function, until the modified IR converges.

2. The method according to claim 1 wherein each basis block in the initial IR has been locally scheduled.

3. The method according to claim 1 wherein the repetition counter is determined by profiling the computer program.

4. The method according to claim 1 wherein the repetition counter is determined by a static heuristic.

5. The method according to claim 1 wherein the estimated profit value assigned to each basic block is equal to the repetition counter for the first instruction in that basic block.

6. The method according to claim 1 wherein the goal function is equal to the sum of the repetition counter for every instruction in the computer program.

7. The method according to claim 1 wherein step (c) comprises the substeps of:

(i) selecting a current basic block;

(ii) storing the profit value of the basic block subsequent to the current basic block in the ordered IR;

(iii) moving the first instruction of the current basic block to all predecessors of the current basic block to create a test IR;

(iv) calculating a new goal function based on the test IR; and (v) adopting the test IR if the difference between the goal function and the new goal function exceeds the profit value stored in substep (ii) and keeping the existing IR if the difference between the goal function and the new goal function does not exceed the profit value stored in substep (ii).

8. The method according to claim 7 wherein, if the difference between the goal function and the new goal function is positive, step (c) further comprises the substeps of:

(i) assigning the difference as the profit value of the current basic block; and (ii) resorting the ordered IR according to the profit values of the basic blocks; and the substep of selecting a current basic block is performed by assigning a pointer of the current basic block to indicate the first basic block in the resorted IR;

and, if the difference is not positive, the substep of selecting a current basic block is performed by assigning it to be the subsequent basic block in the ordered IR.

9. The method according to claim 1 wherein the goal function is equivalent to the total executive time of the computer program.

10. The method according to claim 1 wherein the goal function is equivalent to the fraction of duplicated code in the IR.

11. The method according to claim 1 wherein the goal function is equivalent to the fraction of speculative memory access operations in the IR.

12. The method according to claim 1 wherein the optimized IR comprises a predicated operation.

13. The method according to claim 1 wherein the optimized IR comprises a speculative operation.

14. A method of generating an optimized intermediate representation (IR) of source code for a computer program from an initial IR, both the initial and optimized IRs comprising a plurality of basic blocks, each of which comprises at least one instruction, the method comprising the steps of:

(a) ordering the basic blocks of the initial IR according to an estimated profit value assigned to each basic block;

(b) calculating a goal function that is proportional to the execution time of the computer program according to its initial IR;

(c) iteratively modifying the IR according to the following substeps until the modified IR converges:

(i) selecting a current basic block;

(ii) storing the profit value of the basic block subsequent to the current basic block in the ordered IR;

(iii) moving the first instruction of the current basic block to all predecessors of the current basic block to create a test IR;

(iv) calculating a new goal function based on the test IR;

(v) adopting the test IR if the difference between the goal function and the new goal function exceeds the profit value stored in substep (ii) and keeping the existing IR if the difference between the goal function and the new goal function does not exceed the profit value stored in substep (ii);

(vi) if the difference between the goal function and the new goal function is positive, assigning the difference as the profit value of the current basic block and resorting the ordered IR according to the profit values of the basic blocks.

15. A computer apparatus for generating optimized object code for a computer program from a set of source code instructions comprising:

(a) an input device capable of reading the set of source code instructions;

(b) a compiler connected to the input device comprising:

(i) a front end programmed to:

(1) generate an initial intermediate representation (IR) of the source code instructions comprising a plurality of basic blocks, each of which comprises at least one instruction;

(2) order the basic blocks in the initial IR according to an estimated profit value assigned to each basic block, wherein the estimated profit value is related to a repetition counter assigned to each instruction in the initial IR, the repetition counter being an estimate of the number of times its instruction is performed during execution of the computer program according to the initial IR; and (3) calculate a goal function that measures the degree of optimization of the computer program according to its initial IR;

(ii) an optimizer programmed to test iteratively the effect on the goal function of modifying the IR by moving an instruction from one of the basic blocks to each predecessor of that basic block, adopting the modified IR if the effect is a reduction of the goal function, until the modified IR converges; and (iii) a code generator programmed to convert the converged modified IR to the optimized object code; and (c) an output device connected to the compiler for outputting the optimized object code.

16. The computer apparatus according to claim 15 wherein the front end is further programmed to locally schedule each basic block in the initial intermediate representation.

17. The computer apparatus according to claim 15 wherein the repetition counter is determined by profiling the computer program.

18. The computer apparatus according to claim 15 wherein the repetition counter is determined by a static heuristic.

19. The computer apparatus according to claim 15 wherein the estimated profit value assigned to each basic block is equal to the repetition counter for the first instruction in that basic block.

20. The computer apparatus according to claim 15 wherein the goal function is equal to the sum of the repetition counter for every instruction in the computer program.

21. The computer apparatus according to claim 15 wherein the optimizer is programmed to test iteratively by:

(i) selecting a current basic block;

(ii) storing the profit value of the basic block subsequent to the current basic block in the ordered IR;

(iii) moving the first instruction of the current basic block to all predecessors of the current basic block to create a test IR;

(iv) calculating a new goal function based on the test IR; and (v) adopting the test IR if the difference between the goal function and the new goal function exceeds the profit value stored in (ii) and keeping the existing IR if the difference between the goal function and the new goal function does not exceed the profit value stored in (ii).

22. The computer apparatus according to claim 21 wherein, if the difference between the goal function and the new goal function is positive, the optimizer is further programmed to test iteratively by performing the substeps of:

(i) assigning the difference as the profit value of the current basic block; and (ii) resorting the ordered IR according to the profit values of the basic blocks; and the substep of selecting a current basic block is performed by assigning a pointer of the current basic block to indicate the first basic block in the resorted IR;

and, if the difference is not positive, the substep of selecting a current basic block is performed by assigning it to be the subsequent basic block.

23. The computer apparatus according to claim 15 wherein the goal function is equivalent to the total execution time of the computer program.

24. The computer apparatus according to claim 15 wherein the goal function is equivalent to the fraction of duplicated code in the IR.

25. The computer apparatus according to claim 15 wherein the goal function is equivalent to the fraction of speculative memory access operations in the IR.

26. The computer apparatus according to claim 15 wherein the optimized IR comprises a predicated operation.

27. The computer apparatus according to claim 15 wherein the optimized IR comprises a speculative operation.

28. A computer apparatus for generating optimized object code for a computer program from a set of source code instructions comprising:

(a) an input device capable of reading the set of source code instructions;

(b) a compiler connected to the input device comprising:

(i) a front end programmed to:

(1) generate an initial intermediate representation (IR) of the source code instructions comprising a plurality of basic blocks, each of which comprises at least one instruction;

(2) order the basic blocks in the initial IR according to an estimated profit value assigned to each basic block; and (3) calculate a goal function that is proportional to the execution time of the computer program according to its initial IR;

(ii) an optimizer programmed to modify iteratively the IR according to the following steps until the modified IR converges:

(1) selecting a current basic block;

(2) storing the profit value of the basic block subsequent to the current basic block in the ordered IR;

(3) moving the first instruction of the current basic block to all predecessors of the current basic block to create a test IR;

(4) calculating a new goal function based on the test IR;

(5) adopting the test IR if the difference between the goal function and the new goal function exceeds the profit value stored in (2) and keeping the existing IR if the difference between the goal function and the new goal function does not exceed the profit value stored in (2); and (6) if the difference between the goal function and the new goal function is positive, assigning the difference as the profit value of the current basic block and resorting the ordered IR according to the profit values of the basic blocks; and (iii) a code generator programmed to convert the converged modified IR to the optimized object code; and (c) an output device connected to the compiler for outputting the optimized object code.

* * * * *